United States Patent [19]
Liu et al.

[11] Patent Number: 6,031,943
[45] Date of Patent: *Feb. 29, 2000

[54] METHOD AND APPARATUS FOR DISTORTION DETECTION OF SCANNED IMAGE

[76] Inventors: Hong-Wen Liu; Chun-Chen Lin, both of 2F No. 60, Park Ave. 2, Science Based Industrial Park, Hsin-Chu, Taiwan

[*] Notice: This patent is subject to a terminal disclaimer.

[21] Appl. No.: 08/263,473

[22] Filed: Jun. 22, 1994

[51] Int. Cl.$^7$ ................................ G06K 9/22; G06K 9/28
[52] U.S. Cl. ............................................ 382/313; 382/323
[58] Field of Search .................................... 382/313, 246, 382/247, 241, 323

[56] References Cited

U.S. PATENT DOCUMENTS

| | | | |
|---|---|---|---|
| 3,725,862 | 4/1973 | Roberts | 382/319 |
| 4,553,035 | 11/1985 | Malinsky et al. | 382/313 |
| 4,581,761 | 4/1986 | Ichinokawa et al. | 382/313 |
| 4,872,066 | 10/1989 | Yamagata et al. | 358/336 |
| 4,942,621 | 7/1990 | Angwin | 382/313 |
| 5,170,445 | 12/1992 | Nelson et al. | 382/246 |

Primary Examiner—Andrew Johns
Assistant Examiner—Monica S. Davis
Attorney, Agent, or Firm—Knobbe, Martens, Olson & Bear, LLP

[57] ABSTRACT

The present invention is related to a method and an apparatus for distortion detection of a scanned image. The method for distortion detection of a scanned image comprises: a) obtaining a first value representative of a first scanning position for the image; b) obtaining a second value representative of a second scanning position for the image; and c) comparing the first and second values to determine there is a line-drop situation when the first and second values obtained in a sequential order are not predeterminedly sequential values. The apparatus for distortion detection of a scanned image comprises a value generator generating two values respectively representative of two scanning positions for the image, and a comparing unit for comparing the two values to determine there is a line-drop situation when the two values obtained in a sequential order are not predeterminedly sequential values. The present invention uses a different comparing logic and a simple structure apparatus to achieve the purpose of distortion detection of a scanned image and compensating the image when there is line-drop detected to make the scanning result more perfect.

21 Claims, 5 Drawing Sheets

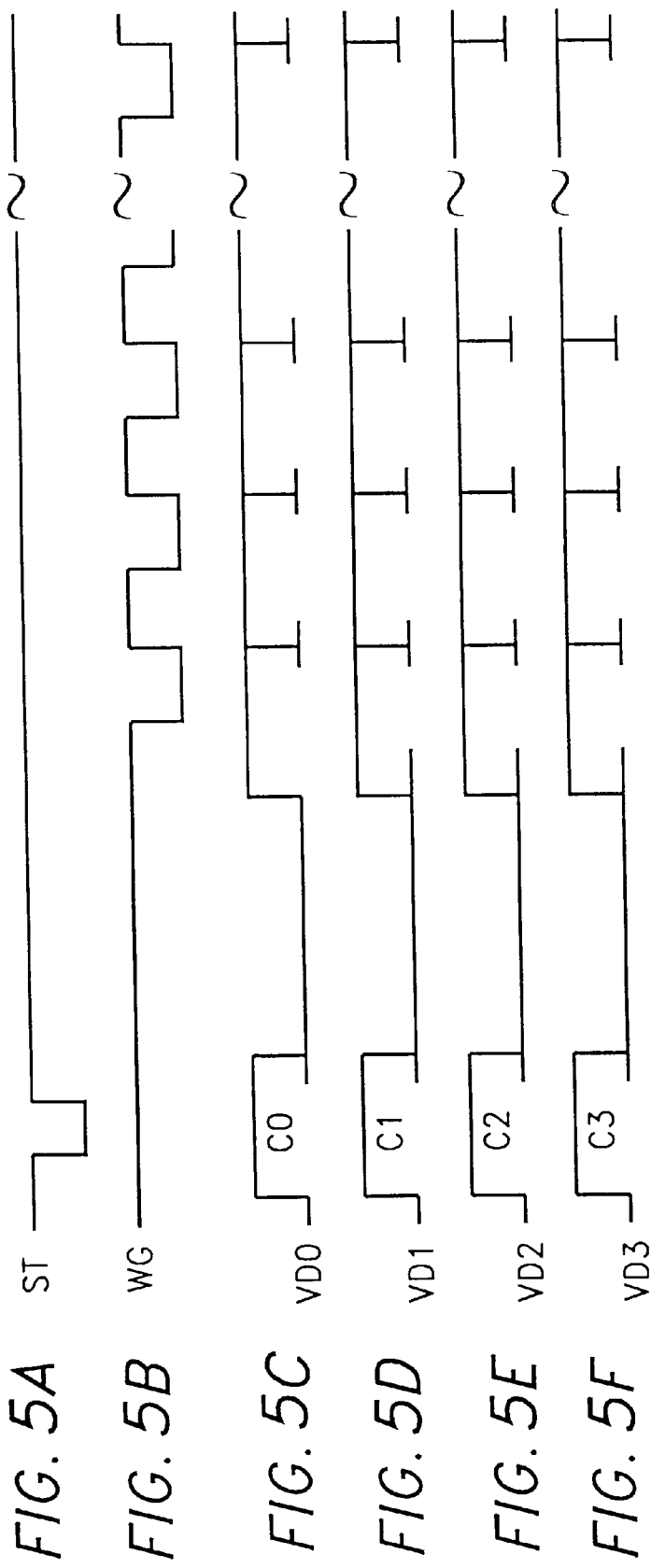
FIG. 5A ST
FIG. 5B WG
FIG. 5C VD0
FIG. 5D VD1
FIG. 5E VD2
FIG. 5F VD3

METHOD AND APPARATUS FOR DISTORTION DETECTION OF SCANNED IMAGE

FIELD OF THE INVENTION

The present invention is related to a detecting method and a detecting apparatus, and more precisely to a method and an apparatus for distortion detection of a scanned image.

BACKGROUND OF THE INVENTION

A hand-moved scanner is a device for transforming the word and picture images into digital signals by photoelectric transformation, and comprises a hand-moved scanning engine and an interface electrically connected to the CPU of a computer. The scanning modes of the scanning engine includes a transverse scanning and a longitudinal scanning. For a transverse scanning, a charge-coupled device (CCD) transforms an intensity of light into an analog voltage signal when it detects the light casted by the scanner and reflected from an image, and transmits the analog signal to the CPU of the computer through the interface. The signal is put into a display memory unit of the computer after it is processed by an application program stored in the computer, and thus the transverse scanning line is displayed on the monitor. For longitudinal scanning, the signal is obtained by making the scanner move longitudinally. By combining the transverse and the longitudinal scanning modes, a two-dimensional image is obtained. In other words, the work of a hand-moved scanner is done by photoelectric transformation in transverse scanning and scanner-movement in longitudinal scanning.

The major defect of the hand-moved scanner is the instability caused by hand operation. To overcome such shortcoming, a hand-moved scanner always includes therein a roller. When the scanner moves, the roller drives a speed-changing gear assembly which in turn drives a diaphragm wheel when it rolls. The diaphragm wheel is installed in a distance sensor and the spokes of the diaphragm wheel are usually designed to be evenly distributed thereon. The distance sensor outputs a high/low potential signal responsive to a particular shield/exposure position of the diaphragm wheel according to the roll of the diaphragm wheel. Whenever the potential is changed between high and low once, the change indicates that a new scanning line has been reached. It is to be noticed that every scanning line corresponds to a predetermined longitudinal shift of the scanner. The unstability caused by hand operation can be minimized according to this kind of design. In other words, even though the moving speed of the scanner is not uniform, the number of scanned transverse lines representable by the changing times of the output potential can be detected. The charge array converted from the light and stored in the CCD must be sent out in order so that there exists a minimum time for a transverse scanning detaining in the CCD. If the charge array is not completely sent out, the next scanning cycle will not be initiated. The duration that a charge array is completely sent out is called an "integrated time". When designing a hand-moved scanner, a designer uses the integrated time as a period for synchronizing the high/low potential signals detected by the distance sensor in order to avoid confusion of an image. However, if the period between two sequential high/low potential signals detected by the distance sensor is less than the integrated time, e.g. the scanner is moved too fast, one of the potential signals will be ignored and the line-drop situation will be caused. The output signal of a hand-moved scanning apparatus consists of a step trigger, a write gate and a video data pulses. Generally speaking, a line of video data responsive to a line movement is generated when a scanner is operated. Before the video data is generated, a sub-scanning synchronous pulse is generated first to represent the beginning of a line of video data. The generation of the write gate pulse accompanies that of the video data pulse and the generation of every write gate pulse accompanies that of n-bit video data. The greater n value is, the more data can be transmitted in a time interval. FIG. 1 shows an output signal generated when n value is 4. The time between two sub-scanning synchronous pulses is the integration time and also is the exposure time of the image sensor of the hand-moved scanner. If the scanner is moved so fast that the output voltage of the distance sensor is changed between high and low more than once in an exposure time, the scanning apparatus can only output a line of video data and will disregard the rest of the data and thus the line-drop situation is caused. FIG. 2 is a diagram showing the time sequence when there is a line-drop, wherein the pulse 21 is outputted by the distance sensor.

Prior art related to line-drop detection for an image scanned by hand-moved scanner as disclosed in ROC Patent Application No. 81107334 is briefly described below. The method for line-drop detection of the prior art includes obtaining a value by counting the times of high/low potential changes the distance sensor encounters, obtaining another value by counting the numbers of the sub-scanning synchronous pulses, and comparing these two values to determine there is a line-drop situation if these two values are not equal. The apparatus of the prior art is shown in FIG. 3, which comprises a distance sensor 30, a counter 31, a sub-scanning synchronous signal generator 32, another counter 33, a comparing unit 34, a multiplexer 35, a memory unit 36, a line-drop counter 37, a data flip-flop 38 and a break-processing unit 39.

The distance sensor 30 sends out a signal 301 responsive to a high/low potential change it encounters to the counter 31 which counts the times of high/low potential changes and outputs a value. The value corresponds to a longitudinally moved distance of the scanner. The counter 33 counts the numbers of the sub-scanning synchronous pulses 321 generated by sub-scanning synchronous signal generator 32 and outputs another value. A step trigger signal enables the comparing unit 34 to compare the two values. If the two values are not equal, it is found that there is a line-drop situation. A signal representing that there is a line-drop situation is outputted by the comparing unit 34 and transmitted to the break-processing unit 39 through the data flip-flop 38. The break-processing unit 39, if enabled, will cause the CPU 40 of a computer to process the line-drop situation directly. The CPU uses an application program to imitate the lost scanning lines automatically. If the break-processing unit 39 is not enabled, the signal representing there is a line-drop situation and outputted by the comparing unit 34 is transmitted to the multiplexer 35. The multiplexer 35 further transmits the signal to the memory unit 36 which stores the values counted by the counters 31 and 33 therein. The difference between the values counted by the counters 31 and 33 equals to the number of dropped lines. At the same time, the value stored in the line-drop counter 37 is accumulatedly carried. After the number of dropped lines is finished recording, the value counted by the counter 31 is stored in the counter 33 to replace the former value and the two values stored in the counters 31 and 33 are the same again. Thus the line-drop detection goes on.

When the scanning process is over, the CPU 40 will read the value counted by the line-drop counter 37, and judge the existence and the number of the dropped lines according to the value. Furthermore, the CPU 40 reads the related data from the memory unit 36 according to the value and judge the positions of the dropped lines. When the positions of the dropped lines are found, the CPU 40 will inform the user to scan again or automatically imitate the lost scanning lines according to the ability of the application program stored in the CPU 40.

The prior art mentioned above uses at least two counters and a comparing unit to detect whether there is a line-drop situation so that the hardware structure thereof is somewhat complicated.

SUMMARY OF THE INVENTION

An object of the present invention is to offer a simpler distortion detection apparatus of a scanned image, which comprises only one counter and uses the CPU as the comparing unit.

Another object of the present invention is to offer a method for distortion detection of a scanned image, which determines there is a distortion situation when two values read by the CPU in a sequential order are not predeterminedly sequential values.

In accordance with the present invention, a method for distortion detection of a scanned image comprises: a) obtaining a first value representative of a first scanning position for the image; b) obtaining a second value representative of a second scanning position for the image; and c) comparing the first and second values to determine there is a line-drop situation when the first and second values obtained in a sequential order are not predeterminedly sequential values.

In accordance with another aspect of the present invention, the values are integers and obtained from a counter.

In accordance with another aspect of the present invention, the scanning positions are digitally represented.

In accordance with another aspect of the present invention, the scanned image is scanned by a hand-moved scanner.

In accordance with another aspect of the present invention, there is provided a distance sensor having an output potential that changes whenever the scanner moves across a pixel.

In accordance with another aspect of the present invention, the distance sensor is a photo-interrupter.

In accordance with another aspect of the present invention, the counter is mounted in the scanner.

In accordance with another aspect of the present invention, the method further includes a step for latching and thus enables the first and second values to be used in an easier manner.

In accordance with another aspect of the present invention, the step is executed by a latch which also stores therein the first and second values.

In accordance with another aspect of the present invention, the latch is mounted in the scanner and electrically connected to a central processing unit which compares the first and second values.

In accordance with another aspect of the present invention, the line-drop is established when the first and second values obtained in a consecutive order are not consecutive values.

In accordance with another aspect of the present invention, the method further includes a step for modifying the image, when it is established, there is a line-drop situation, and the modifying step is executed by means of interpolation.

In accordance with the present invention, an apparatus for distortion detection of a scanned image comprises a value generator generating two values respectively representative of two scanning positions for the image, and a comparing unit for comparing the two values to determine if there is a line-drop situation when the two values obtained in a sequential order are not predeterminedly sequential values.

In accordance with another aspect of the present invention, the value generator includes a distance sensor having an output potential changed whenever a scanner included in the scanning apparatus moves across a pixel, and a counter electrically connected to the distance sensor for counting times of which the output potential has been changed to provide the two values representative of the two scanning positions respectively.

In accordance with another aspect of the present invention, the comparing unit is a central processing unit electrically connected to the counter for establishing the line-drop when the values in a consecutive order are not consecutive values.

In accordance with another aspect of the present invention, the central processing unit also determines whether an image-modifying effect is needed.

In accordance with another aspect of the present invention, the apparatus further comprises a latch electrically connected between the counter and the central processing unit for latching and storing therein the values, a multiplexer electrically connected between the counter and the latch in order to cut down a number of used signal cables, a series-parallel converting unit electrically connected between the counter and the multiplexer for converting parallel data into series data, a data-transforming interface electrically connected between the multiplexer and the central processing unit for transforming image data into data acceptable by the central processing unit.

The present invention may be best understood through the following description with reference to the accompanying drawings, in which:

BRIEF DESCRIPTION OF THE DRAWING

FIG. 5 is a schematic diagram showing transmission signals in a preferred embodiment of an apparatus for distortion detection of a scanned image according to the present invention.

DETAILED DESCRIPTION OF THE PREFERRED EMBODIMENT

The present invention will now be described more specifically with reference to the following examples. It is to be noted that the following descriptions of preferred embodiments of this invention are presented herein for purpose of illustration and description only; it is not intended to be exhaustive or to be limited to the precise form disclosed. And, the principles and techniques well known by those who are skilled in the art are not superfluously described in following statements.

Figures 1A, 1B, 1C, 1D, 1E, 1F:
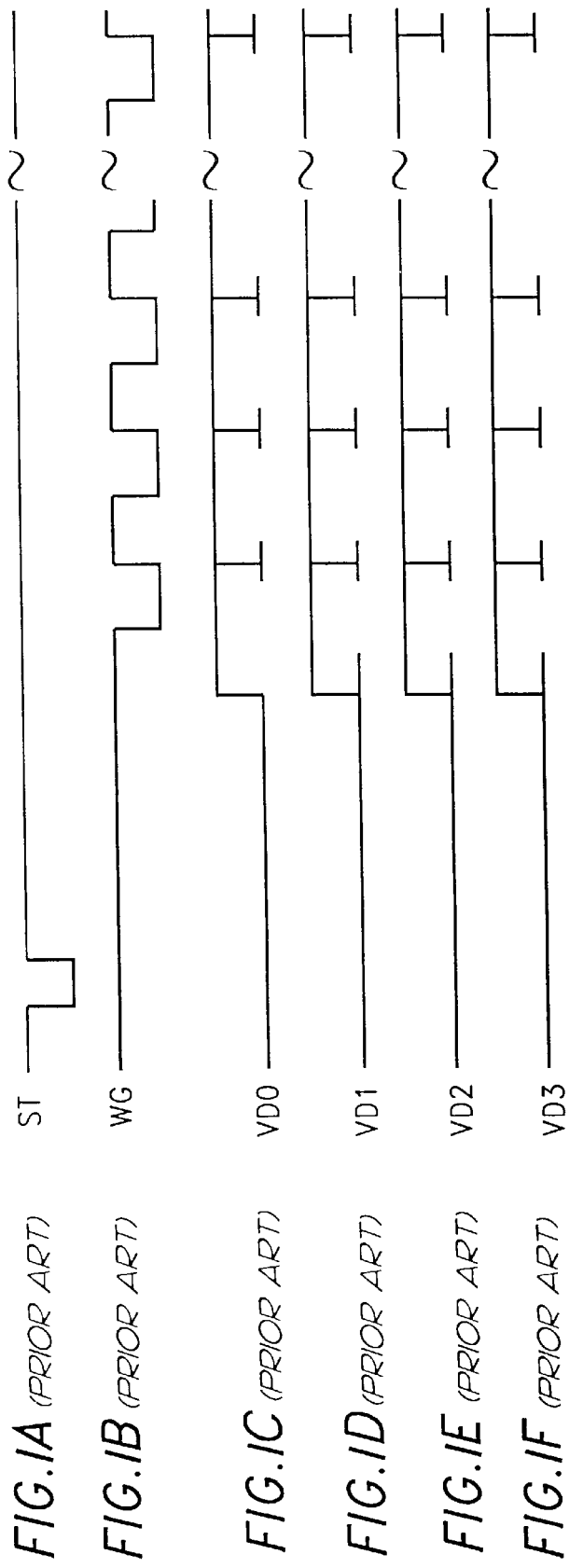
FIG. 1 is a schematic diagram showing time sequence pulses outputted by a hand-moved scanner when the video data is of 4-bit.
Figures 2A, 2B, 2C:
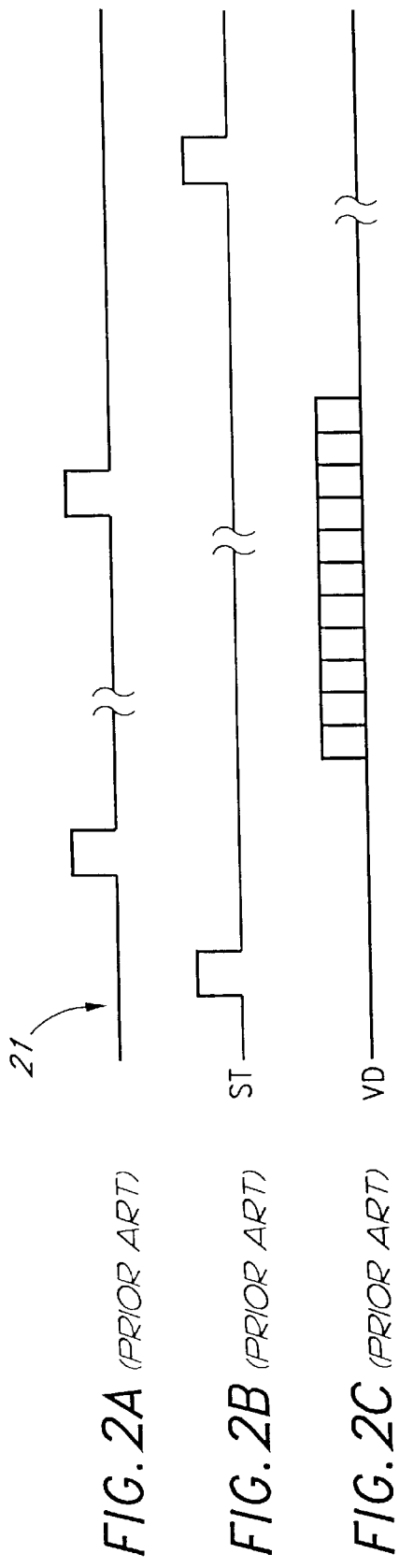
FIG. 2 is a schematic diagram showing time sequence pulses outputted by a hand-moved scanner when there is a line-drop situation.
Figure 3:
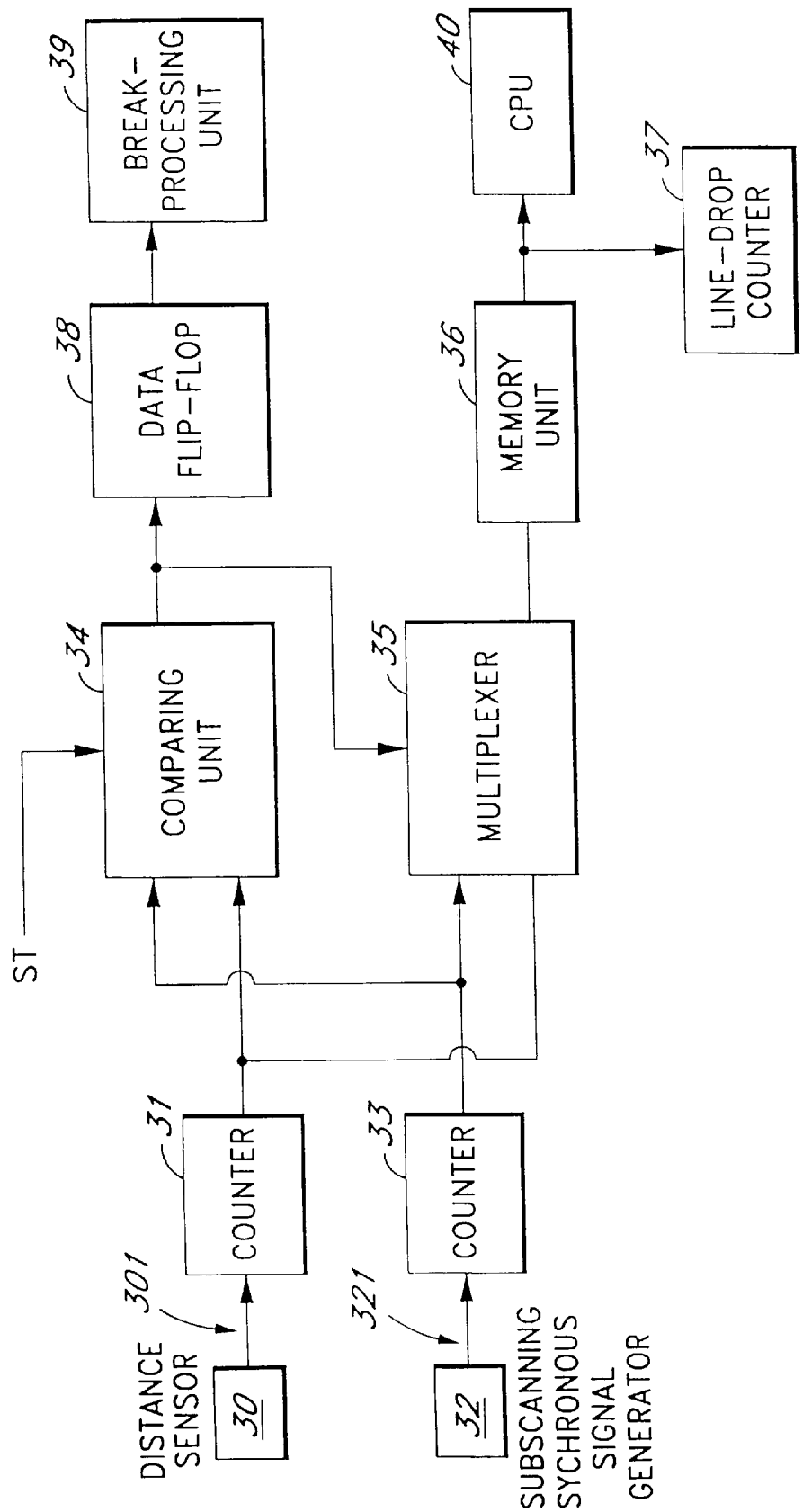
FIG. 3 is a block diagram showing a prior apparatus for distortion detection of a scanned image.
Figure 4:
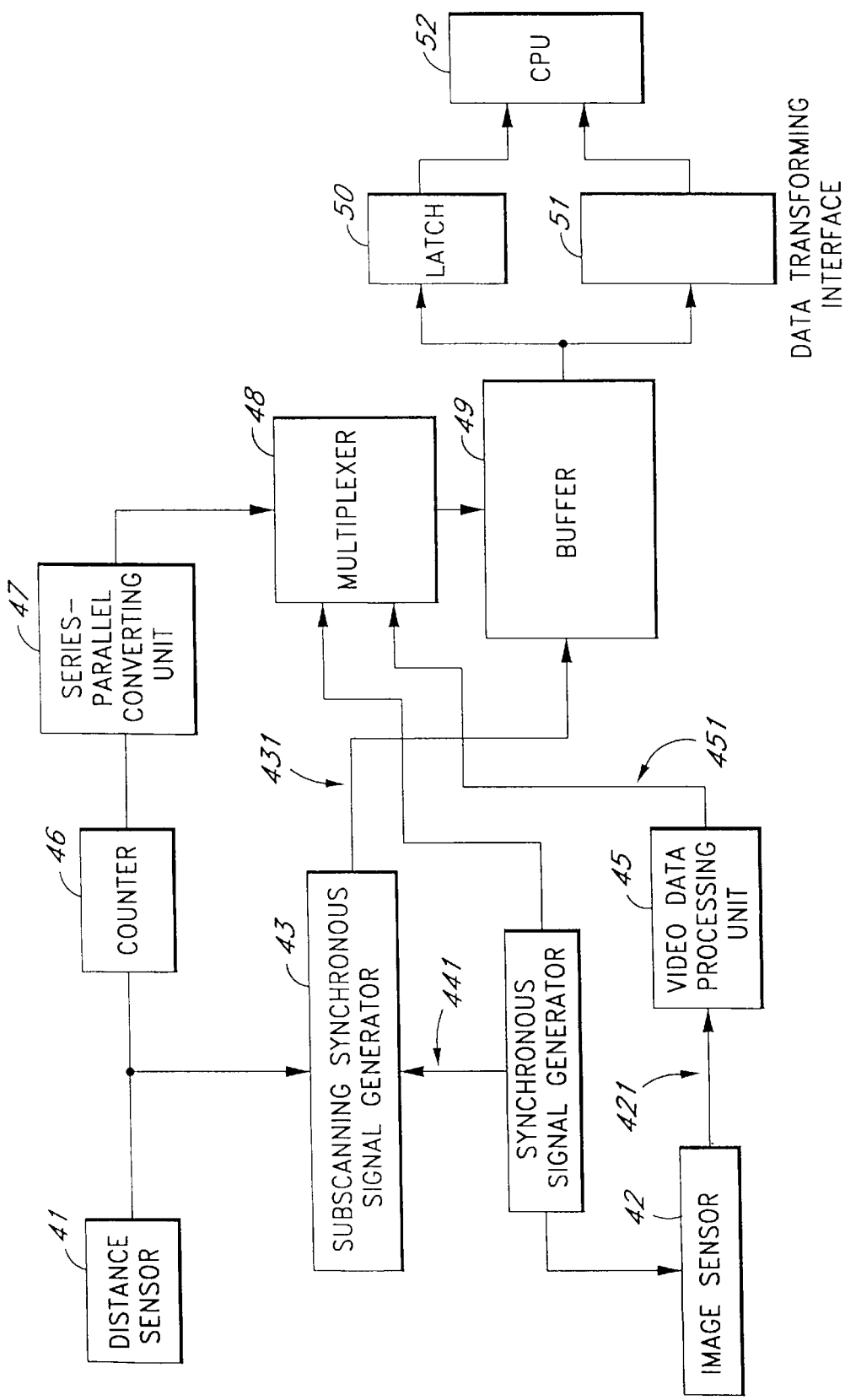
FIG. 4 is a block diagram showing a preferred embodiment of an apparatus for distortion detection of a scanned image according to the present invention.

Referring now to FIG. 4, a potential outputted by a distance sensor 41 is changed between high and low once whenever the scanner moves across a pixel whose distance is equal to a spoke of a diaphragm wheel installed in he distance sensor 41. A counter 46 obtains a value by counting the times of the high/low potential changes the distance sensor 41 encounters, and the high/low potential signals generated by the distance sensor 41 triggers the sub-scanning synchronous signal generator 43 to generate the sub-scanning synchronous signal 431. The synchronous signal generator 44 provides a clock for an image sensor 42 and also provides a signal 441 necessary for the sub-scanning synchronous signal generator 43 to generate the sub-scanning synchronous signal 431. A video-data processing unit 45 converts the analog signal 421 generated by the image sensor 42 into a digital signal 451 fitting the processing form of a computer. The value counted by the counter 46 is converted into a form fitting the requirement of interface transmission through a series-parallel converting unit 47. The signal representing the value and other signals, such as synchronous signal and video data signal, are transmitted through a multiplexer 48 to cut down the number of used signal cables. The signals transmitted by the multiplexer 48 and outputted by the sub-scanning synchronous signal generator 43 need to be amplified because the connecting wires between the multiplexer 48 or the sub-scanning synchronous signal generator 43 and the devices electrically connected therewith, such as a latch 50, are usually very long. The purpose can be achieved by using a buffer 49 to enhance the drive ability. The latch 50 is used for latching the value counted by the counter 46 to enable a CPU 52 of the computer to read the value in an easier manner. Before entering the CPU 52, the signal 451 generated by the video-data processing unit 45 has to be converted into a form acceptable by the CPU 52 through a data-transforming interface 51.

The CPU 52 receives every line of the scanning video data and reads the value stored in the latch 50 at the same time after every sub-scanning synchronous signal. If the values read to be compared by the CPU 52 in a consecutive order are not consecutive numbers, the CPU 52 will determine that there is a line-drop situation. In detail, the potential outputted by the distance sensor 41 is changed between high and low more than once to have the counter 46 accumulated more than once after the CPU 52 reads a first line of video data. Therefore, when the CPU 52 reads a second line of video data, the value accordingly read by the CPU 52 and the value just previously read when the CPU 52 reads the first line of video data will not be consecutive. When detecting the line-drop situation, the CPU 52 will launch a modifying step which is executed by means of interpolation, i.e. the CPU 52 uses the average of the pixel value for the video data just before the dropped line and that just after the dropped line to construct and/or compensate the video data of the dropped line, to make the picture look continuous and/or integral.

FIG. 5 is a schematic diagram showing transmission signals in a preferred embodiment of an apparatus for distortion detection of a scanned image according to the present invention. The transmitted signals includes a step trigger pulse ST, a writing gate pulse WG and four-bit video data pulses, VD0, VD1, VD2 and VD3. The symbols C0, C1, C2 and C3 are four values counted by the counter 46 as shown in FIG. 4, and representative of the four video data pulses respectively.

The principles and techniques well known by those who are skilled in the art are not superfluously described in.

To sum up, the characteristic of the present invention is using a comparing logic different from the prior arts and a simpler-structured apparatus to achieve the purpose of distortion detection of a scanned image and compensating the image when there is a line-drop situation detected to make the scanning result more perfect.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What we claim is:

1. A method for distortion detection of a scanned image, comprising the steps of:

(a) obtaining a first digital value representative of a first scanning line position for said image; and (b) obtaining a second digital value representative of a second scanning line position for said image; and (c) comparing said first and second digital values to determine if there is a line-drop situation when said first and second values obtained in a sequential order are not predeterminedly sequential values.

2. A method according to claim 1, wherein said first and second values are integers.

3. A method according to claim 1, wherein said scanned image is scanned by a hand-moved scanner.

4. A method according to claim 3, wherein said scanner is provided with a distance sensor having an output potential changed whenever said scanner moves across a pixel.

5. A method according to claim 4, wherein said distance sensor is a photo-interrupter.

6. A method according to claim 1, wherein said first and second values are obtained from a counter.

7. A method according to claim 6, wherein said counter is mounted in a scanner.

8. A method according to claim 1, further including a step for latching and thus enabling said first and second values to be used in an easier manner.

9. A method according to claim 8, wherein said step is executed by a latch which is also storing therein said first and second values.

10. A method according to claim 9, wherein said latch is mounted in a scanner and electrically connected to a central processing unit of a computer which compares said first and second values.

11. A method according to claim 1, wherein said line-drop situation is established when said first and second values obtained in a consecutive order are not sequential values.

12. A method according to claim 1, further including a step for modifying said image when it is established that there is a line-drop situation.

13. A method according to claim 12, wherein said modifying step is executed by means of interpolation.

14. An apparatus for distortion detection of a scanned image, comprising:
- a value generator generating two values respectively representative of two scanning positions for said image; and
- a comparing unit for comparing said two values to determine if there is a line-drop situation when said two values obtained in a sequential order are not predeterminedly sequential values.

15. An apparatus according to claim 14, wherein said value generator includes:
- a distance sensor having an output potential which is changed whenever a scanner included in said apparatus moves across a pixel; and
- a counter electrically connected to said distance sensor for counting the number of times which said output potential has been changed to provide said two values representative of said two scanning positions respectively.

16. An apparatus according to claim 15, wherein said comparing unit is a central processing unit electrically connected to said counter for establishing said line-drop when said two values in a sequential order are not consecutive values.

17. An apparatus according to claim 16, wherein said central processing unit also determines whether an image-modifying effect is needed.

18. An apparatus according to claim 16, further comprising a latch electrically connected between said counter and said central processing unit for latching and storing therein said two values.

19. An apparatus according to claim 18, further comprising a multiplexer electrically connected between said counter and said latch in order to cut down a number of used signal cables.

20. An apparatus according to claim 19, further comprising a series-parallel converting unit electrically connected between said counter and said multiplexer for converting parallel data into series data.

21. An apparatus according to claim 20, further comprising a data-transforming interface electrically connected between said multiplexer and said central processing unit for transforming image data into data acceptable by said central processing unit.

\* \* \* \* \*